United States Patent [19]

Tomooka et al.

[11] 4,425,512

[45] Jan. 10, 1984

[54] POWER SUPPLY SYSTEM

[75] Inventors: Keiji Tomooka, Yokohama; Makoto Ogawa, Chigasaki; Hideo Ishiguro, Yokohama, all of Japan

[73] Assignee: Hitachi, Ltd., Tokyo, Japan

[21] Appl. No.: 367,078

[22] Filed: Apr. 9, 1982

[30] Foreign Application Priority Data

Apr. 10, 1981 [JP] Japan ................................. 56-53034

[51] Int. Cl.³ .............................................. H01H 1/60
[52] U.S. Cl. ..................................... 307/138; 179/70; 179/6.3 R
[58] Field of Search ............ 307/125, 127, 138, 141.4; 179/6.3 R, 18 AH, 70, 77

[56] References Cited

U.S. PATENT DOCUMENTS

| 3,531,598 | 9/1970 | McNair, Jr. | 307/127 |
| 4,254,305 | 3/1981 | Treiber | 179/70 X |
| 4,277,647 | 7/1981 | Brolin et al. | 179/6.3 R |

Primary Examiner—Elliot A. Goldberg
Assistant Examiner—D. Jennings
Attorney, Agent, or Firm—Antonelli, Terry & Wands

[57] ABSTRACT

A power supply system for supplying a d.c. current from a center equipment to a terminal device through a two-wire line, is capable of properly supplying the current for communicating purposes irrespective of the connection condition of the two-wire line and accurately stopping the supply of current to the terminal device in the non-communicating condition.

9 Claims, 3 Drawing Figures

POWER SUPPLY SYSTEM

BACKGROUND OF THE INVENTION

1. Field of the Invention

The present invention relates to a power supply system for supplying d.c. power from a center equipment (e.g., a telephone exchange) to a terminal device by way of a two-wire line.

2. Description of the Prior Art

A known type of system for supplying d.c. power from a center equipment, e.g., a telephone exchange to a terminal device by way of a two-wire line will be described first with reference to the accompanying drawings.

FIG. 1 is a wiring diagram showing by way of example the construction of a prior art power supply system.

In the Figure, numeral 10 designates a terminal device, 11 a hook switch of the terminal device, 12 a terminating power supply rectifier of the terminal device, 13 a power supply circuit for converting and providing the required d.c. power to the respective component parts of the terminal device 10, 20 a two-wire line, 30A a terminal circuit of the center equipment (e.g., a telephone exchange), 31 a d.c. power source of the circuit 30A, 32 a polarity-reversing switch, and 33 a terminating signal input terminal.

Where the terminal device 10 is an originating party, its hook switch 11 is turned ON (closed) so that the corresponding terminal circuit 30A of the center equipment applies the positive and negative potentials of the d.c. power source 31 to the power supply circuit 13 by way for example of the lines A and B of the two-wire line 20 and the required d.c. power is supplied through conversion to the respective parts, thereby effecting the desired communication between the terminal device 10 and the center equipment.

In this case, a terminating signal TER is not applied to the terminating signal input terminal 33 of the terminal circuit 30A from another part of the center equipment (e.g., a telephone exchange controller) so that the polarity-reversing switch 32 is not operated, and the positive and negative potentials of the d.c. power source 31 are connected as such to the lines A and B of the two-wire line 20 thereby supplying the required power to the power supply circuit 13.

Where the terminal device 10 is a terminating party, a terminating signal TER is applied to the terminal interfacing circuit 30A via the terminating signal input terminal 33 from another part of the center equipment (e.g., the telephone exchange controller) and the polarity-reversing switch 32 changes its state. In other words, the positive and negative potentials of the d.c. power source 31 are reversed and connected to the lines A and B of the two-wire line 20.

As a result, since the rectifier 12 of the terminal device 10 is in the forward direction irrespective of whether the hook switch 11 is ON, the required power is supplied to the power supply circuit 13 so that the respective parts of the terminal device 10 are brought into operation and a given signal is received from the center equipment thereby effecting the desired communication therebetween.

Also it is arranged so that in the non-communicating condition where there is no originating communication or terminating communication, the hook switch 11 is turned OFF (open) and the polarity-reversing switch 32 does not change state with the rectifier 12 being placed in the reverse direction, thereby preventing the supply of power to the terminal device 10 from the d.c. power source 31.

With this prior art system, if, for example, the lines A and B of the two-wire line 20 were connected in wrong polarity during the initial installation of the terminal device 10, the power would be supplied wastefully during the non-communicating period, whereas when the terminal is terminated so that the polarity-reversing switch 32 performs a polarity reversing operation in response to the terminating signal TER, the supply of power becomes impossible.

It is to be noted that if the two-wire line 20 must be connected after the polarities have been investigated and confirmed satisfactorily and thus, the connection requires much trouble and is complicated extremely.

SUMMARY OF THE INVENTION

It is the primary object of the invention to provide an improved power supply system which overcomes the foregoing deficiencies of the prior art system and which is capable of properly performing the supply of d.c. power for communication irrespective of the connection condition of the two-wire line and positively stopping the supply of power to the terminal device in the non-communicating condition.

In accordance with a power supply system of the present invention designed such that upon termination of a terminal device the polarity of a d.c. power source of a center equipment is reversed and a d.c. power is supplied to the terminal device by way of a two-wire line, there is a feature that where there is no originating signal or terminating signal associated with the terminal device, if the flow of current to the terminal device in excess of a given time is detected on the side of the center equipment, it is considered that the connection polarity of the two-wire line has been reversed and thereafter in accordance with the result of the detection the polarity of the d.c. power source with respect to the two-wire line is reversed in the normal condition, whereby the supply of power to the terminal device is stopped in the non-communicating condition and upon termination of the terminal device the polarity reversal of the d.c. power source is released and the d.c. power is supplied to the terminal device.

DESCRIPTION OF THE PREFERRED EMBODIMENTS

The present invention will now be described in greater detail with reference to the illustrated embodiments.

Figure 2:
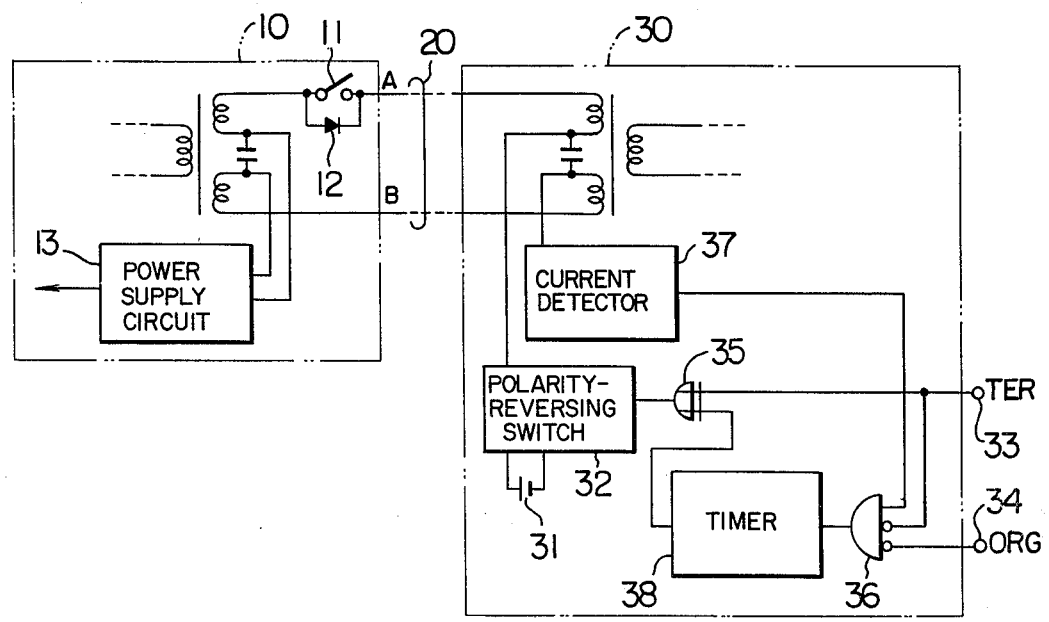
FIG. 2 is a wiring diagram showing the construction of an embodiment of a power supply system according to the invention.

FIG. 2 is a wiring diagram showing the construction of an embodiment of a power supply system according to the invention.

Figure 1:
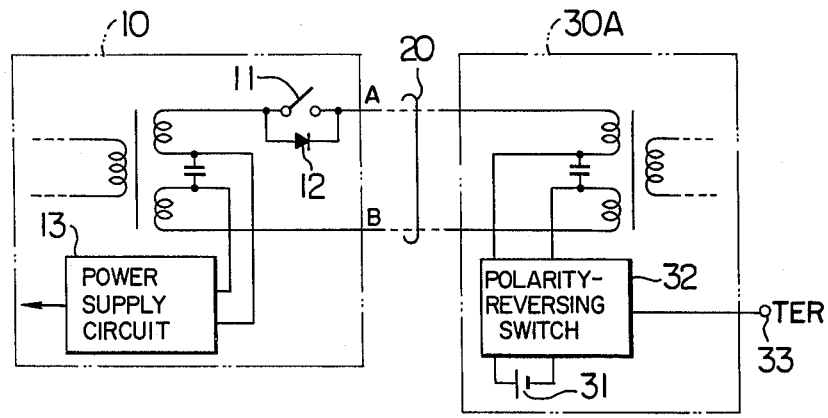
FIG. 1 is a wiring diagram showing the construction of a prior art power supply system by way of example.

In the Figure, numeral 30 designates a terminal interfacing circuit of a center equipment (e.g., a telephone exchange), 31 a d.c. power source, 32 its polarity-reversing switch, 33 a terminating signal input terminal, 34 an originating signal input terminal, 35 an exclusive OR gate, 36 an AND gate, 37 a current detector, 38 a timer, and the other numerals designate equivalents to tho designated by the same numerals in FIG. 1.

Firstly, where the terminal device 10 is an originating party, the d.c. power is supplied without polarity reversal in the same manner as the prior art system of FIG. 1. More specifically, the d.c. current is supplied from the d.c. power source 31 without polarity reversal since no terminating signal TER is generated in the center equipment. Also, even if the current detector 37 detects the current flow, an originating signal ORG has been generated (it can be generated by detecting an originating call as is well known in the art) so that the AND gate 36 is closed and there is no possibility of the polarity-reversing switch 32 being operated by the detection result of the current detector 37.

It is to be noted that generally the originating signal ORG is generated at the expiration of a given processing time required for the transmission, reception and detection of a signal to the center equipment from the terminal device 10 after the closing of the hook switch 11 and during the interval the output of the current detector 37 is applied to the timer 38 via the AND gate 36.

However, as will be described later, the timer 38 performs an input monitoring function at intervals of a given time period (about six seconds) and this time period is selected greater than the given processing time such that no output is generated by the input during the interval during which the AND gate 36 is open and hence the polarity-reversing switch 32 is not operated.

Next, where the terminal device 10 is a terminating party, the d.c. current with the reversed polarity is supplied in the like manner as the prior art system of FIG. 1. More specifically, a terminating signal TER is generated in the center equipment so that the signal operates the polarity-reversing switch 32 through the exclusive OR gate 35 and the current reversed in polarity is supplied from the d.c. power source 31. Also, the AND gate 36 is closed by the terminating signal TER so that even if the current supplied is detected by the current detector 37, the detection result is prevented by the AND gate 36 thereby supplying the current continuously.

While, in either of the above-described originating party and the terminating party, the connection of the two-wire line 20 with the terminal device 10 and the terminal interfacing circuit 30, respectively, is considered to be normal (the line A is positive and the line B is negative), if the polarity is reversed for some reason or other, the supply current flows in the non-communicating condition (where no terminating signal TER and no originating signal ORG are generated) so that the current detector 37 detects the current flow and the detection result is monitored by the timer 38 by way of the AND gate 36 for a given time period (e.g., a time period corresponding at least to the time required for the usual transient condition to come to a steady-state condition). When the current flow continues in excess of the given time period, it is considered that the connection polarity of the two-wire line 20 has been reversed and the polarity-reversing switch 32 is operated thereby reversing the polarity of the d.c. power source 31 and stopping the current flow to the terminal device 10.

Thereafter, the output of the timer 38 is maintained continuously unless the connection of the two-wire line 20 is restored to the normal polarity and thus the polarity-reversing switch 32 is also held in the polarity-reversing position.

In other words, the connection of the two-wire line 20 is effectively held in the normal polarity condition so that when a terminating signal TER is generated at a later time, no output is generated from the exclusive OR gate 35 and the polarity-reversing switch 32 is returned to the original position, thereby supplying the current of the reversed polarity to the terminal device 10 from the d.c. power source 31.

Note that where the terminal device 10 is calling only an originating signal ORG is generated so that the polarity-reversing switch 32 is not released and consequently the current of the normal polarity is supplied.

Figure 3:
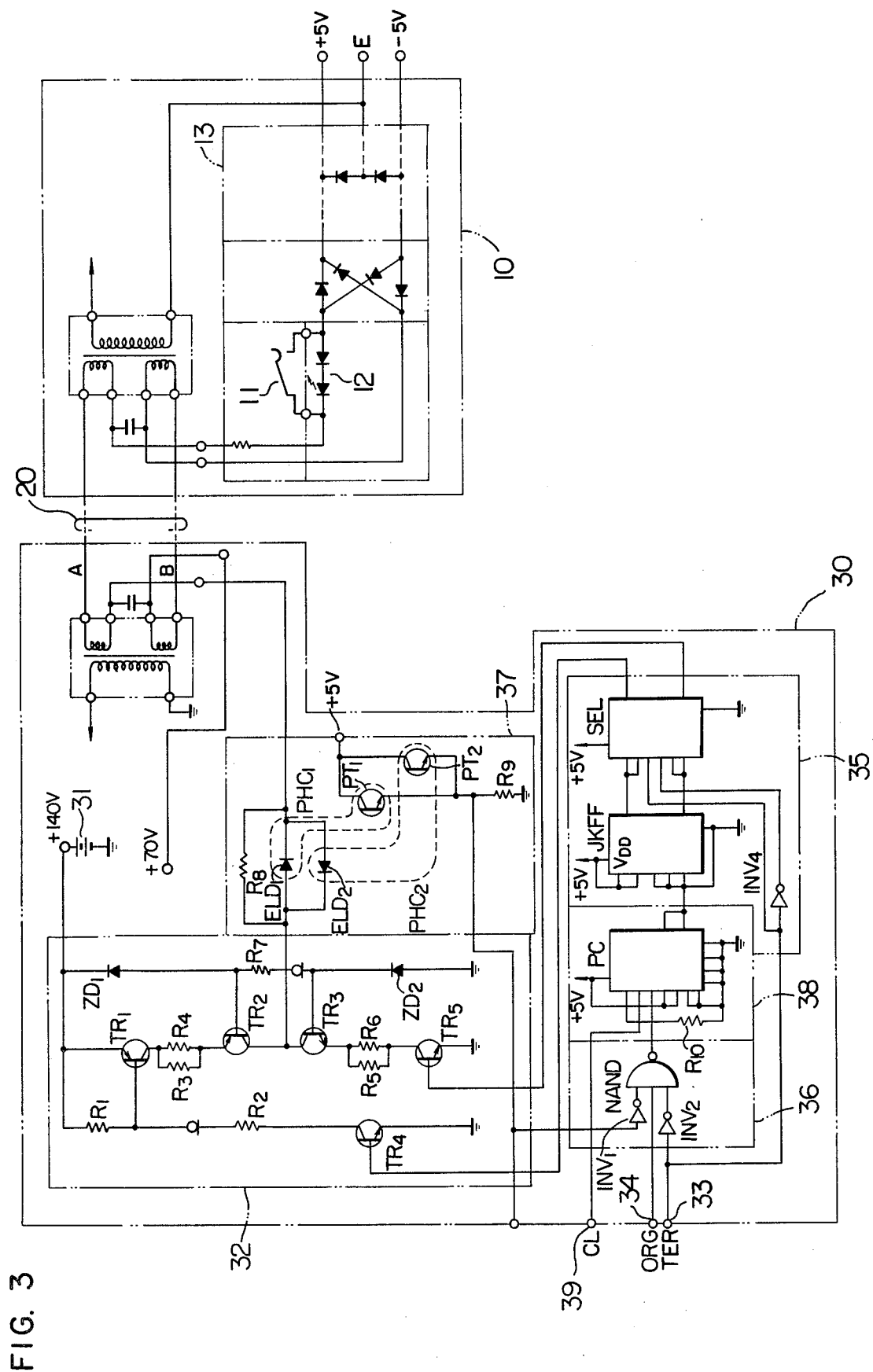
FIG. 3 is a wiring diagram showing in detail the construction of circuitry for performing the power supply system of the invention.

FIG. 3 is a wiring diagram showing in detail the construction of the circuitry shown in FIG. 2, and the polarity-reversing switch 32 comprises resistors $R_1$ to $R_7$, transistors $TR_1$ to $TR_5$ and Zener diodes $ZD_1$ and $ZD_2$ whereby in response to the outputs (alternately generated) of a selector SEL which will be described later the transistors $TR_1$, $TR_2$, $TR_4$ and $TR_3$, $TR_5$ are turned on and off and voltages of $+70$ V and $-70$ V, respectively, are separately applied to the terminal device 10 via the two-wire line 20.

The exclusive OR gate 35 comprises an inverter $INV_4$, a J-K flip-flop JKFF and the selector SEL.

The AND gate 36 comprises inverters $INV_1$, $INV_2$ and a NAND gate NAND and performs the logical operation on the inputs from the current detector 37, the terminating signal input terminal 33 and the originating signal input terminal 34.

The current detector 37 comprises resistors $R_8$ and $R_9$, and photo-couplers $PHC_1$, $PHC_2$ including light-emitting diodes $ELD_1$ and $ELD_2$ and phototransistors $PT_1$ and $PT_2$.

The timer 38 comprises a resistor $R_{10}$ and a programmable counter PC for counting the clock signals from a clock input terminal 39.

The current supply circuit shown in FIG. 3 operates in the same manner as the circuit shown in FIG. 2 and thus its operation will not be described.

From the foregoing detailed descriptions it will be seen that the present invention has remarkable effects that in the communication system of the type described the supply of d.c. current with the proper d.c. power source polarity is effected irrespective of the polarity with which a two-wire line is connected with a terminal device and a center equipment and moreover the supply of wasteful current in the non-communicating condition can be stopped positively, thereby reducing the number of man-hours required for the installation of the two-wire line, ensuring the proper communication between the terminal device and the center equipment despite the existence of any erroneous connection and eliminating the consumption of power in the non-communicating condition.

We claim:

1. A power supply apparatus comprising:
   a power supply circuit of a terminal device;
   a polarity-reversing switch for a d.c. power source of a center equipment, connected to said terminal device through a two-wire line including a hook switch and a terminating power supply rectifier;
   a current detector for detecting a current supplied through said polarity-reversing switch;

an AND gate for performing a logical operation on an output from said current detector, a terminating signal and an originating signal;

a timer for delaying an output from said AND gate a predetermined time; and an exclusive OR gate for performing a logical operation on an output from said timer and said terminating signal to generate an output for switching said d.c. power source polarity-reversing switch.

2. An apparatus according to claim 1, wherein said polarity-reversing switch comprises a transistor switching circuit.

3. An apparatus according to claim 1, wherein said exclusive OR gate comprises a J-K flip-flop, an inverter and a selector.

4. An apparatus according to claim 1, wherein said AND gate comprises an inverter and a NAND gate.

5. An apparatus according to claim 1, wherein said timer comprises a programmable counter.

6. An apparatus according to claim 1, wherein said current detector comprises at least one photocoupler and a resistor.

7. A power supply system in which upon termination of communication at a terminal device the polarity of a d.c. power source of a center equipment is reversed and in which a d.c. current is supplied to said terminal device from said center equipment through a two-wire line means whereby, at a time of originating communciation from said terminal device a d.c. voltage is supplied from the center equipment through an off-hook switch and an originating information signal is transmitted from the terminal device to the center equipment, and at a time of terminating communication at said terminal device power is supplied to the terminal device by reversing the polarity of the d.c. power source at the center equipment in response to a terminating information signal applied to the center equipment, and at the times of no originating communicaton and no terminating communication a polarity-reversing circuit of the d.c. power source of the center equipment is controlled on the basis of the result of logically processing a detected signal from a current detector of the center equipment together with said originating and terminating information to prevent supplying power from said center equipment to said terminal device at the times of no originating communication and no terminating communication.

8. A power supply system according to claim 7 further characterized in that at the times of no originating communication and no terminating communication when a supply current lasting longer than a predetermined time is detected by said current detector, the connecting polarity of a two-wire line is determined to be reversed, and thereafter the polarity of the d.c. voltage with respect to the two-wire line is reversed so that the power supply to the terminal device is stopped in the non-communicating condition.

9. A power supply apparatus comprising:

a terminal device;

a central equipment including a d.c. power supply;

a two-wire line coupling said terminal device to said central equipment;

means for providing an originating signal from said terminal device to said central equipment when said terminal device is to operate as an originating station;

means provided in said central equipment for providing d.c. power from said central equipment d.c. power source to said terminal device through said two-wire line when said terminal device is operating as an originating station;

a polarity-reversing switch provided in said central equipment for reversing the polarity of said d.c. power which is supplied from said d.c. power source to said terminal device through said two-wire line when said central equipment receives a terminating signal indicating that said terminal device is to be operated as a terminating station;

a current detector for detecting a current supplied through said polarity-reversing switch;

means for determining when current is flowing through said polarity-reversing switch for greater than a predetermined time when the terminal device is in a non-communicating condition of neither operating as an originating station or a terminating station, said terminating means including means for logically processing the states of an output signal from said current detector, said originating signal and said terminating signal; and means for controlling the state of said polarity-reversing switch in accordance with an output from said determining means to prevent the supply of power from said central equipment to said terminal device when said terminal device is in said non-communicating condition and to provide proper polarity d.c. power from said central equipment power supply to said terminal device when said terminal device is operating as an originating station or as a terminating station.

* * * * *